May 23, 1933.  E. E. TISZA ET AL  1,910,973
ELECTRODE HOLDER
Filed May 6, 1932
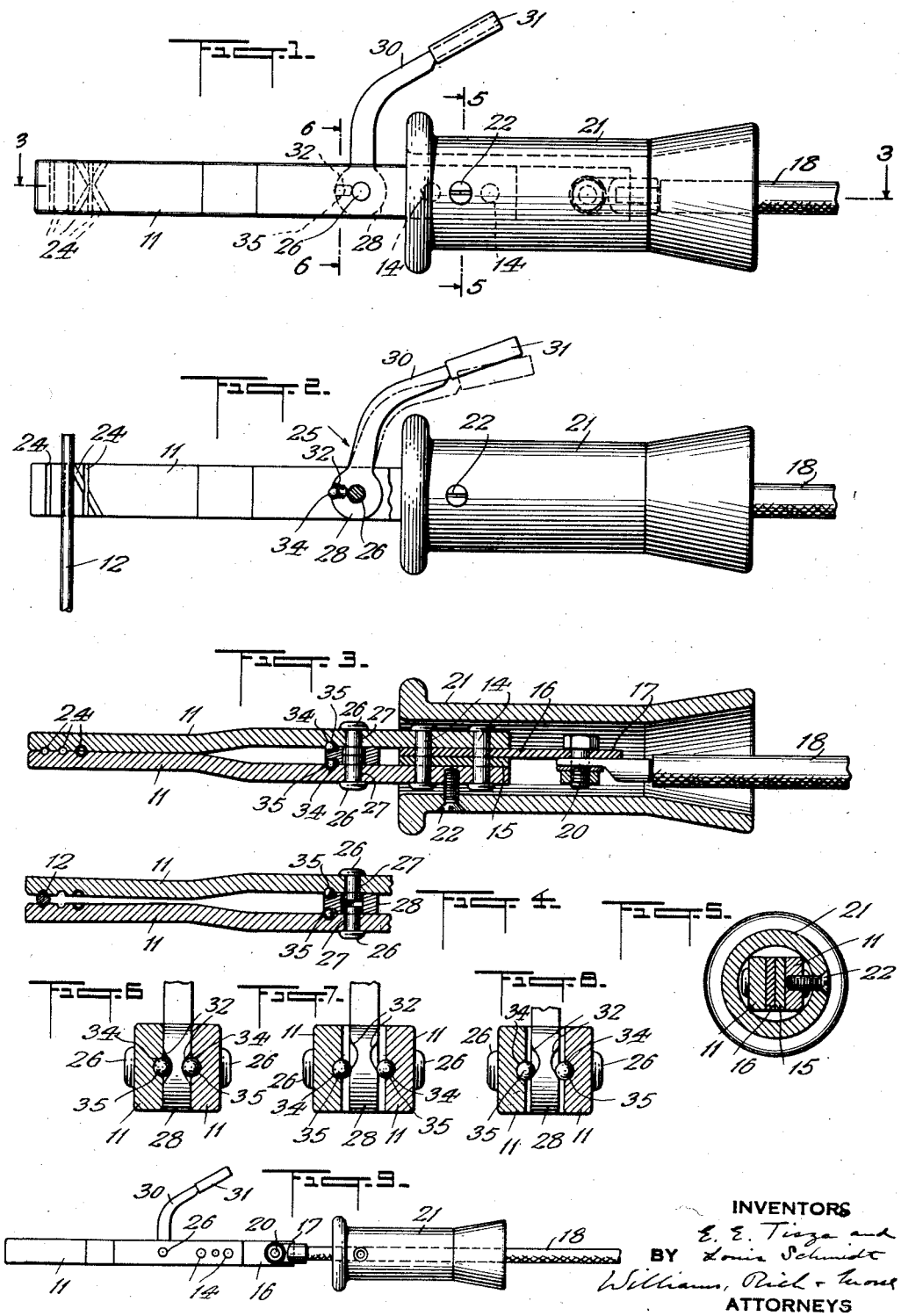
INVENTORS
E. E. Tisza and
BY Louis Schmidt
Williams, Rich & Morse
ATTORNEYS Patented May 23, 1933

1,910,973

UNITED STATES PATENT OFFICE

ERNEST E. TISZA, OF ENGLEWOOD, AND LOUIS SCHMIDT, OF UNION CITY, NEW JERSEY, ASSIGNORS TO WILSON WELDER & METALS COMPANY, INC., OF NORTH BERGEN, NEW JERSEY, A CORPORATION OF NEW YORK

ELECTRODE HOLDER

Application filed May 6, 1932. Serial No. 609,588.

This invention relates to electrode holders for use in connection with arc welding apparatus.

An object of the invention is to provide an improved device of the character mentioned, which is simple, reliable, efficient and otherwise satisfactory.

The invention will be understood from the following description, taken in connection with the accompanying drawing, in which—

Figure 1 is a view in elevation of an electrode holder embodying the invention; Figure 2 is a view similar to that of Figure 1, one of the electrode clamping blades being broken away; Figure 3 is a central, longitudinal, sectional plan view taken on line 3—3 of Figure 1; Figure 4 is a view, similar to Figure 3, showing only the electrode clamp blades with an electrode therebetween; Figure 5 is a transverse sectional view taken on line 5—5 of Figure 1; Figure 6 is a transverse sectional view, taken on line 6—6 of Figure 1, showing, on an enlarged scale, the cam mechanism for spreading apart the clamp blades; Figure 7 is a view, similar to Figure 6, showing the relation of the cam mechanism to the clamp blades when the latter are separated preparatory to the introduction of an electrode therebetween; Figure 8 is a view, also similar to Figure 6, and showing the relation of the cam mechanism to the clamp blades when such blades are gripping an electrode; and Figure 9 is a view in elevation on a reduced scale showing the position of the handle of the electrode holder preparatory to its being fastened in position on the shank of the electrode clamp after attaching a current carrying cable to such shank.

As shown in the drawing, the electrode clamp comprises a pair of clamp blades 11, constructed from a suitable metal offering but little resistance to the flow of electric current and possessing sufficient inherent resiliency to enable them to firmly grip an electrode 12 intermediate their forward ends where they normally contact with each other. These clamp blades 11 are so shaped that they are spaced from each other throughout the greater portion of their length, and are permanently secured to each other at their rear or shank portions in any suitable manner, as by a pair of rivets 14 which pass through said blades and through metal spacing members 15 and 16. As shown, the spacing member 16 is provided with a lug or extension 17 to which a current supplying cable 18 may be connected by suitable means, such as a bolt 20. The clamp blades 11, the spacing members 15 and 16, and the current supplying cable 18 are thus maintained in efficient electrical connection with one another.

Surrounding the shank portion of the electrode clamp blades 11, is a tubular handle or grip 21 which serves as a housing for such shank portion, for the lug 17, for the bolt 20, and for the end of the cable 18 which is attached to that lug. This handle is removably secured to the shank portion of the electrode clamp by a screw 22 which passes through the wall of the handle and is threaded into one of the clamp blades 11. When it is desired to detach the cable 18 from the lug 17, the handle is removed from the shank portion of the electrode clamp and slid back on the cable, as shown in Figure 9, a sufficient distance to permit the bolt 20 to be removed. In attaching a cable to the holder, the procedure is exactly reversed, it being taken into account that the cable is first threaded through the handle or grip 21 before such cable is connected to the lug 17.

In order that the clamp blades 11 may be conveniently sprung apart so as to permit an electrode 12 to be inserted into any one of the several grooves 24 provided in the meeting faces of the clamp blades at the forward end of the electrode holder, there is provided a cam mechanism, which may be conveniently actuated by the welding operator. As shown, the cam is supported on a split shaft in the form of a pair of shouldered rivets 26, which are located within aligned openings 27 in the clamp blades 11, the beaded outer ends of the rivets serving, in conjunction with the shouldered portions thereof, to permanently retain the rivets in the respective openings 27. On the inner ends or shoulder portions of the rivets 26, is rotatably mounted the cam which has a hub or disc 28, provided with a handle 30 which projects upwardly and rearwardly in convenient reach of the welding operator, the end of the handle 30 being provided with an insulating cover 31. The hub or disc 28 is provided at opposite sides with correspondingly located indentations 32 adapted to partially receive a pair of steel balls 34 seated within hemispherical pockets 35 formed in the inner or adjacent faces of the clamp blades 11. From an inspection of Figures 6 to 8, inclusive, it will be appreciated that the bottom of the respective indentations 32 is so formed that the balls 34 never wholly leave the indentations, and this is true even though the handle 30 of the cam mechanism is depressed to its maximum extent. Because of the relation, just described, of the steel balls to the indentations 32, the clamp blades 11 will always move toward their electrode-gripping positions when the actuating lever for the cam mechanism 25 is released. When, however, an electrode is gripped by the clamp blades, the position of the balls 34 with respect to the indentations 32 will be more or less the relation shown in Figure 8, depending of course upon the diameter of the electrode.

From the foregoing, it will be understood that in the electrode holder embodying this invention each of the clamp blades carries its proportion of current; that the cam mechanism is not subjected to any detrimental current influences because no current passes through the same; that the cam mechanism is guarded against excessive heat of welding at the arc because of its remote location to such source of heat; and that the holder may be used in various positions without sharply bending the welding cable at or in the vicinity of the handle due to the flared condition of the central passage of such handle.

Although only one form of the invention is herein shown and described, it will be understood that various changes may be made without departing from the spirit of the invention or the scope of the following claims.

What is claimed is:

1. An electrode holder, comprising a pair of resilient clamp blades secured together at one end and movable toward each other at their opposite ends under the influence of their inherent resiliency, and a cam mechanism disposed intermediate said blades and operable thereon to separate the same and thereby condition them to receive therebetween an electrode, said mechanism comprising a rotatable cam member journalled intermediate said clamp blades and provided on one side with a cam face, and a loose ball between which and said cam face relative movement is effected upon rotation of said cam member, said ball being seated in a pocket in one of said clamp blades and there held against displacement with respect to the blade upon rotation of said cam member.

2. An electrode holder, comprising a pair of resilient clamp blades secured together at one end and movable toward each other at their opposite ends under the influence of their inherent resiliency, and a cam mechanism, disposed intermediate said blades and operable thereon to separate the same and thereby condition them to receive therebetween an electrode, said mechanism comprising a split shaft, one portion of which is secured to one of said clamp blades and the other portion of which is secured to the other of said clamp blades, a rotatable cam member journalled on said split shaft and provided on each side with a cam face, and a loose ball seated in a pocket in each of said clamp blades, between which loose balls and said cam faces relative movement is effected upon rotation of said cam member while the former are held against displacement with respect to said blades.

In testimony whereof, we have signed this specification.

ERNEST E. TISZA.
LOUIS SCHMIDT.